US012644079B2

(12) United States Patent
Lu et al.

(10) Patent No.: US 12,644,079 B2
(45) Date of Patent: Jun. 2, 2026

(54) PREMIX COMPRISING ALKYL POLYGLYCOSIDE FOR USE IN PREPARING A LIQUID DETERGENT FORMULATION

(71) Applicant: BASF SE, Ludwigshafen am Rhein (DE)

(72) Inventors: Xu Lu, Shanghai (CN); Yan Kang, Shanghai (CN); Yungi Lee, Shanghai (CN); Shan Ling Ge, Shanghai (CN); Roland Boehn, Ludwigshafen (DE)

(73) Assignee: BASF SE, Ludwigshafen am Rhein (DE)

(*) Notice: Subject to any disclaimer, the term of this patent is extended or adjusted under 35 U.S.C. 154(b) by 291 days.

(21) Appl. No.: 18/570,300

(22) PCT Filed: Jul. 6, 2022

(86) PCT No.: PCT/EP2022/068766
§ 371 (c)(1),
(2) Date: Dec. 14, 2023

(87) PCT Pub. No.: WO2023/285245
PCT Pub. Date: Jan. 19, 2023

(65) Prior Publication Data

US 2024/0287423 A1 Aug. 29, 2024

(30) Foreign Application Priority Data

Jul. 16, 2021 (WO) ................ PCT/CN2021/106670

(51) Int. Cl.
*C11D 11/00* (2006.01)
*C11D 1/66* (2006.01)
*C11D 3/34* (2006.01)
*C11D 3/43* (2006.01)

(52) U.S. Cl.
CPC .......... *C11D 11/0094* (2013.01); *C11D 1/662* (2013.01); *C11D 3/3418* (2013.01); *C11D 3/43* (2013.01); *C11D 2111/14* (2024.01)

(58) Field of Classification Search
CPC ... C11D 11/0094; C11D 1/662; C11D 3/3418; C11D 3/43; C11D 2111/14; C11D 1/123; C11D 1/22; C11D 1/83
USPC .......................................................... 510/527
See application file for complete search history.

(56) References Cited

U.S. PATENT DOCUMENTS

| | | | | |
|---|---|---|---|---|
| 4,483,787 | A | 11/1984 | Jones et al. | |
| 5,753,606 | A | 5/1998 | Hees et al. | |
| 5,869,439 | A * | 2/1999 | Thomas | C11D 1/94 510/237 |
| 5,941,812 | A | 8/1999 | Gruening et al. | |
| 9,670,433 | B1 * | 6/2017 | Hodge | C11D 3/43 |
| 2005/0049160 | A1 | 3/2005 | Szewczyk et al. | |

FOREIGN PATENT DOCUMENTS

| | | | | |
|---|---|---|---|---|
| DE | 60309883 | T2 * | 5/2007 | C11D 3/3753 |
| EP | 0509608 | A2 * | 10/1992 | C11D 3/3418 |
| WO | 9615138 | A1 | 5/1996 | |
| WO | WO 2012028203 | A1 * | 3/2012 | C11D 7/36 |
| WO | WO 2012045364 | A2 * | 4/2012 | C11D 3/2075 |
| WO | 2020169632 | A1 | 8/2020 | |

OTHER PUBLICATIONS

International Search Report and Written Opinion for corresponding PCT/EP22/68766, mailed Oct. 10, 2022, 11 pages.

* cited by examiner

*Primary Examiner* — Eisa B Elhilo
(74) *Attorney, Agent, or Firm* — Armstrong Teasdale LLP

(57) ABSTRACT

Described herein is a premix including an alkyl polyglycoside, preferably $C_{10}$-$C_{16}$ alkyl polyglycoside, a hydrotrope and a solvent including water. Also described herein are a method of using the premix in preparing a liquid detergent formulation and a method for preparing a liquid detergent composition by using the premix.

16 Claims, No Drawings

PREMIX COMPRISING ALKYL POLYGLYCOSIDE FOR USE IN PREPARING A LIQUID DETERGENT FORMULATION

CROSS-REFERENCE TO RELATED APPLICATIONS

This application is a U.S. National Phase Application of International Patent Application No. PCT/EP22/68766, filed Jul. 6, 2022, which claims priority to CN Patent Application No. PCT/CN21/106670, filed Jul. 16, 2021, the contents of which are hereby incorporated by reference herein.

TECHNICAL FIELD

The present invention relates to a premix comprising an alkyl polyglycoside, a hytrotrope, and a solvent, wherein the alkyl polyglycoside has an alkyl chain of 10-16 carbon atoms, and the hytrotrope is preferably sodium cumene sulfonate and the solvent is preferably water.

BACKGROUND

Sugar surfactants, for example, alkyl polyglycosides are distinguished by excellent detergent properties and high ecotoxicological compatibility. For this reason, these classes of nonionic surfactants are acquiring increasing significance. They are generally used in liquid and powder detergent formulations, for example, laundry and dishwashing detergents and hair shampoos.

Commercially available alkyl polyglycosides are typically sold at an active level of from about 40% up to 50% for higher alkyl chain length alkyl polyglycosides like $C_{10}$-$C_{16}$ alkyl polyglycosides, and from about 60% to about 70% for the lower alkyl chain length alkyl polyglycosides like $C_8$-$C_{10}$ alkyl polyglycosides. While increasing the percent actives of alkyl polyglycosides in surfactant is highly desirable from an application standpoint, since higher actives levels bring about less product being actually used in order to effectuate a particular property, however, increase of $C_{10}$-$C_{16}$ alkyl polyglycosides in actives levels may cause undesirable high viscosity of the product at low temperature driving handling difficulty at low temperature or wintertime. Most notably, certain alkyl polyglycosides, such as $C_{10}$-$C_{16}$ alkyl polyglycosides exhibits's unacceptably high viscosities at low temperature when transferring them such as by pouring or pumping. In addition, higher alkyl ($C_{10}$-$C_{16}$) polyglycosides have a tendency to crystallize during storage below 30° C. due to their supersaturated state. Upon crystallization, the $C_{10}$-$C_{16}$ alkyl polyglycosides become turbid, i.e. cloudy and opaque in appearance due to the solids contained falling out of their supersaturated state, which is a highly undesirably phenomenon and makes it difficult to achieve homogeneous product quality. In order to solve this problem, the $C_{10}$-$C_{16}$ alkyl polyglycosides solution must be either heated in order to resolvate the crystals and decrease viscosity, which make the process expensive and time-consuming, or should be blended with lower alkyl chain polyglycosides like $C_8$-$C_{10}$ alkyl polyglycosides as hydrotrope. However, this solution has required high concentration of lower alkyl chain polyglucoside (>20%) to achieve desirable properties. Thus, it remains a challenge to obtain an alkyl polyglycoside containing $C_{10}$-$C_{16}$ alkyl polyglycosides composition which has reduced viscosity and can prevent solid crystallization without excess dilution of $C_{10}$-$C_{16}$ alkyl polyglycoside with other ingredients to achieve easy handling in overall typical operation temperatures (5° C. to 40° C.). Furthermore, the composition comprising $C_{10}$-$C_{16}$ alkyl polyglycoside solution can facilitate the processes in preparing a cleaning formulation comprising alkyl polyglycoside.

SUMMARY OF INVENTION

The surprising discovery has been made by the present invention, that a premix comprising an alkyl polyglycoside, at least one hydrotrope and one solvent can solve the before mentioned difficulties.

In one aspect, the present invention is related to a premix comprising an alkyl polyglycoside, at least one hydrotrope, and at least one solvent, wherein the alkyl polyglycoside characterized by the formula:

$$C_nH_{2n+1}O(C_6H_{10}O_5)_xH,$$

wherein n is an integer from 8 to 18, preferably from 8 to 16, more preferably from 10 to 16;

x is from 1 to 3, preferably from 1.1 to about 2.7, more preferably from 1.2 to 2;

wherein the at least one hydrotrope is selected from the group consisting of sodium cumene sulfonate, sodium xylene sulfonate, sodium toluene sulfonate, dioctyl sodium sulfosuccinate, alkyl naphthalene sulfonate and dihexyl sodium sulfosuccinate, preferably the hydrotrope is sodium cumene sulfonate; and wherein the at least one solvent comprises water and optionally at least one water-miscible organic solvent; preferably the solvent is essentially only water, and more preferably is water The premixes of the present invention are useful in a wide variety of products, especially detergent products such as liquid and/or granule laundry detergent formulation, dishwashing detergent composition.

Hence, in a further aspect, the present invention provides a premix for use in preparing a liquid detergent formulation. The liquid detergent formulation is preferably a liquid laundry detergent formulation or a liquid dishwashing detergent formulation.

In another aspect, the present invention provides a method for preparing a liquid laundry detergent formulation or a liquid dishwashing detergent formulation, comprising one step of adding the premix as defined in the present invention into the formulation, Such method comprises mixing the inventive premix at any point in time during the preparation of the final/finished composition, i.e. at the very start as first addition, or at the end as the very last addition, and/or any time in between.

In still another aspect, the present invention is related to use of the premix as defined in the present invention for preparing a liquid laundry detergent formulation or a liquid dishwashing detergent formulation.

Surprisingly and unexpectedly, the inventors have now discovered that the premix of the present invention has reduced viscosity even at very low temperature and can eliminate the tendency of alkyl polyglycosides to crystallize during prolonged storage under ambient conditions or even at a very low temperature, and thus makes it possible to achieve the objective as outlined above.

DESCRIPTION

Throughout the description, including the claims, the term "comprising one" or "comprising a" should be understood as being synonymous with the term "comprising at least one", unless otherwise specified, and "between" should be understood as being inclusive of the limits.

The terms "a", "an" and "the" are used to refer to one or to more than one (i.e., to at least one) of the grammatical object of the article.

The term "and/or" includes the meanings "and", "or" and also all the other possible combinations of the elements connected to this term.

It should be noted that in specifying any range of concentration, weight ratio or amount, any particular upper concentration, weight ratio or amount can be associated with any particular lower concentration, weight ratio or amount, respectively.

The term "essentially" used herein, refers to, within the meaning of this invention, that mostly, for example higher than 95% in concentration, or higher than 98% in concentration.

The term "premix" or "premixture" used herein refers to a mixture of ingredients designed to be mixed with other ingredients to form a finished or final composition such as a liquid laundry detergent and liquid dishwashing detergent. A "premix" can itself be an article of commerce, and can be sold for later mixing with other ingredients at a remote location, to obtain a finished composition.

As used herein, the abbreviation of APG stands for alkyl polyglycoside.

Throughout this specification, "alkyl polyglucoside" is used to include alkyl polyglycosides because the stereochemistry of the saccharide moiety is changed during the preparation reaction.

All the percentages, ratios and proportions herein are by weight, unless otherwise specified.

"Viscosity" is measured by means of a Brookfield Viscometer Model DV2T LVT with a Thermosel System. The viscosity of the systems is measured at 20° C. during storage to assess stability.

By "pumpable" herein is meant a viscosity below about 10 000 mPas, preferably below about 3000 mPas. The term "about" used herein, means, within the meaning of this invention, plus or minus 5%, preferably plus or minus 2%, including the exact number.

The present invention is related to a premix comprising an alkyl polyglycoside, at least one hydrotrope, and at least one solvent, wherein the alkyl polyglycoside characterized by the formula $$C_nH_{2n+1}O(C_6H_{10}O_5)_xH,$$

wherein n is an integer from 8 to 18, preferably from 8 to 16, more preferably from 10 to 16;

x is from 1 to 3, preferably from 1.1 to about 2.7, more preferably from 1.2 to 2;

wherein the at least one hydrotrope is selected from the group consisting of sodium cumene sulfonate, sodium xylene sulfonate, sodium toluene sulfonate, dioctyl sodium sulfosuccinate, alkyl naphthalene sulfonate and dihexyl sodium sulfosuccinate, preferably the hydrotrope is sodium cumene sulfonate; and wherein the at least one solvent comprises water and optionally at least one water-miscible organic solvent; preferably the solvent is essentially only water, and more preferably is water According to any one of the embodiments of the present invention, the premix comprises the alkyl polyglycoside having an alkyl group of 10 to 16 carbon atoms (i.e. $C_{10}$-$C_{16}$ alkyl polyglycoside), in a range of 60% to about 100% preferably 70%, 75%, 80%, 85%, 90%, 95% or 98% to 100% by weight of the total weight of alkyl polyglycoside and any value in between "60" and "100".

According to any one of the embodiments of the present invention, the premix comprises the alkyl polyglycoside and the hydrotrope with the weight ratio of the alkyl polyglycoside and the hydrotrope from 30/70 to 90/10, preferably 70/30 to 85/15, more preferably 75/25 to 80/20, preferably the alkyl polyglucoside having an alkyl group of 10 to 16 carbon atoms (i.e. $C_{10}$-$C_{16}$ alkyl polyglycoside).

According to any one of the embodiments of the present invention, the premix may optionally comprise at least one water-miscible organic solvent, such as methanol, ethanol, propanol, isopropanol, glycerol, propylene glycol, ethylene glycol, 1,2-propanediol, sorbitol or a mixture thereof.

According to any one of the embodiments of the present invention, the premix comprises the solvent in an amount of 40% to 90%, preferably from 45% to 65% by total weight of the premix.

According to any one of the embodiments of the present invention, the premix has a pour point at −10° C. to 5° C., preferably −10° C. to 0° C., more preferably −10° C. to −3° C.

The premix of the present invention is suitable for use in a wide range of detergent products. It is particularly suited to use in liquid laundry detergents and liquid dishwashing detergents. In such an application the premix will be mixed with one or more components to form the final/finished composition; such mixing may occur at any point in time during the preparation of the final/finished composition, i.e. at the very start as first addition, or at the end as the very last addition, and any time in between.

<Finished Composition>

The premix of the present invention is suitable for use in a wide range of detergent products. It is particularly suited to use in liquid laundry detergents and liquid dishwashing detergents. In such an application the premix will be mixed with one or more components chosen from anionic, cationic, nonionic, zwitterionic, amphoteric surfactants, fatty acids, citric acid and other builders, chelating agents, bleach and bleach activators, enzymes, suds suppressing agents, organic solvents including ethanol, 1,2-propane diol, soil removing polymers and other ingredients known to be useful in such detergents.

The liquid detergents are suitably formulated by adding the premix of the present invention, the surfactants components to the water, then adding the other ingredients with stirring.

The liquid detergents may contain one or more components chosen from anionic, nonionic, cationic, zwitterionic, amphoteric surfactants. Preferably, the liquid detergents comprise from 5 to 70% by weight, in particular from 15 to 55% by weight, more in particular from 25 to 45% by weight of at least one abovementioned surfactant.

A wide range of anionic surfactant is useful in the invention. Useful anionic surfactants include alkyl aryl sulfonates, alkyl sulfonates, alkyl sulfates, alkyl ether sulfates, alkyl phosphates, amine oxides, isethionates, $C_8$-$C_{30}$ fatty acid soaps, taurines, betaines, sulfobetaines, and mixtures thereof. Suitable anionic surfactants are, for example, sulfates of (fatty) alcohols having from 8 to 22, preferably from 10 to 18 carbon atoms, especially $C_9C_{11}$-alcohol sulfates, $C_{12}C_{14}$-alcohol sulfates, $C_{12}$-$C_{18}$-alcohol sulfates, lauryl sulfate, cetyl sulfate, myristyl sulfate, palmityl sulfate, stearyl sulfate and tallow fat alcohol sulfate. sulfated alkoxylated $C_8$-$C_{22}$-alcohols (alkyl ether sulfates): compounds of this type are prepared, for example, by first alkoxylating a $C_8$-$C_{22}$-alcohol, preferably a $C_{10}$-$C_{18}$-alcohol, for example a fatty alcohol, and then sulfating the alkoxylation product. For the alkoxylation, preference is given to using ethylene oxide. linear $C_8$-$C_{20}$-alkylbenzenesulfonates (LAS), preferably linear $C_9$-$C_{13}$-alkylbenzenesulfonates and -alkyltoluenesulfonates. alkanesulfonates, especially $C_8$-$C_{24}$-alkanesulfonates, preferably $C_{10}$-$C_{18}$-alkanesulfonates. fatty acid ester sulfonates of the formula $R1CH(SO_3M)CO_2R2$ in which R1 is $C_6$-$C_{20}$-alkyl, preferably $C_8$-$C_{16}$-alkyl, and R2 is $C_1$-$C_4$-alkyl, preferably methyl or ethyl, and M is hydrogen, a water-soluble cation, for example alkali metal cation or ammonium ion. olefinsulfonates which from 8 to 22, preferably from 12 to 18, carbon atoms. isethionates, especially acyl isethionates and N-acyl taurates. N-acyl sarcosinates. sulfosuccinates (mono- or diesters of sulfosuccinic acid) and alkyl succinates. organic phosphate esters, especially mixtures of mono- and diester phosphates of hydroxyl-terminated alkoxide condensates and salts thereof. These include polyoxalkylated alkylarylphosphate esters, for example based on alkoxylated $C_8$-$C_{22}$-alcohols or alkoxylated phenol derivatives. soaps such as the sodium and potassium salts of $C_8$-$C_{24}$-carboxylic acids. The anionic surfactants are added to the detergent preferably in the form of salts. Suitable salts are, for example, alkali metal salts such as sodium, potassium and lithium salts, and ammonium salts such as hydroxyethylammonium, di(hydroxyethyl)ammonium and tri(hydroxyethyl)ammonium salts.

A wide range of nonionic surfactant is useful in the invention. The nonionic surfactants will, in general, be polyoxyalkylene compounds, i.e., the product of reaction of alkylene oxides such as ethylene oxide or propylene oxide or mixtures thereof, with starter molecules that contain active hydrogen atoms that are reactive with the alkylene oxide. Such starter molecules include alcohols, amines, carboxylic acids, amides, and mercaptans. Where the starter molecule is an alcohol, the reaction product is known as an alcohol alkoxylate. The polyoxyalkylene compounds can have a variety of block and heteric structures. For example, they can comprise a single block of alkylene oxide, or they can be diblock alkoxylates or triblock alkoxylates. Within the block structures, the blocks can be all ethylene oxide or all propylene oxide, or the blocks can contain a heteric mixture of alkylene oxides. A preferred nonionic surfactant is selected from the class of alcohol ethoxylates, which are alcohol alkoxylates where the alkylene oxide is ethylene oxide. The alcohols used to make the alcohol alkoxylates and the preferred ethoxylates of the invention are, in general, those having from 6 to 18 carbon atoms. A suitable surfactant is an adduct of seven ethylene oxide units with a single $C_{12}$-$C_{15}$ alcohol unit. Such surfactants are known to those of skill in the art under various designations. For example, it may be referred to as a 7 mole ethoxylate of a $C_{12-15}$ alcohol, or a 7 ethylene oxide adduct, or a $C_{12}$-$C_{15}$ alcohol 7 mole ethoxylate, or a 7 EO adduct of a $C_{12}$-$C_{15}$ alcohol. All such naming conventions are used interchangeably in the art as well as here.

The liquid detergents may further comprise a cationic surfactant. Suitable cationic surfactants include: $C_7$-$C_{25}$-alkylamines; N, N-dimethyl-N—($C_7$-$C_{25}$-hydroxyalkyl)ammonium salts; mono- and di($C_7$-$C_{25}$-alkyl)dimethylammonium compounds quaternized with alkylating agents; ester quats, especially quaternary esterified mono-, di- and trialkanolamines which have been esterified with $C_8$-$C_{22}$-carboxylic acids and imidazoline quaternary ammonium.

The liquid detergents may further comprise an amphoteric and/or zwitterionic surfactant. Suitable amphoteric surfactants are derivatives of aliphatic or heterocyclic, secondary and tertiary amines in which the aliphatic radicals preferably have from 8 to 18 carbon atoms and at least one radical comprises one or more anionic water-soluble groups, for example one or more carboxylate, sulfonate, sulfate, phosphate or phosphonate groups. Example of suitable amphoteric surfactants are 3-(alkylamino)propionates, (alkylamino)acetates, 3-(dialkylamino)propionates and (dialkylamino)acetates, where preferably at least one alkyl group comprises from 8 to 18 carbon atoms. [(2-acylaminoethyl)(2-hydroxyethyl)amino]acetates where the acyl group preferably comprises from 8 to 18 carbon atoms, (alkylamino)propanesulfonates where the alkyl group preferably comprises from 8 to 18 carbon atoms. Suitable zwitterionic surfactants are, for example: amine oxides, especially alkyldimethylamine oxides and alkyldiethylamine oxides, where the alkyl group preferably comprises from 8 to 18 carbon atoms. betaines, especially carbobetaines, sulfobetaines, phosphobetaines, cocoamidopropylbetaine.

The detergent compositions of the present invention may also contain one or more conventional additives found in liquid laundry detergents or other aqueous detergent compositions. Such additives are known to those of skill in the art, and include, for example: antiredeposition agents; bleaches; builders such as sodium sulfate or sodium carbonate; buffers such as borax; defoamers; enzymes; brighteners; enzyme stabilizers; solvents such as ethanol or glycerol; hydrotropes such as sodium xylene sulfonate; preservatives; softening agents such as quaternary ammonium salts; formulation aids such as sorbitol; fragrances; dyes; and colorants. The types of additives used, and the levels of additives in the formulations, will be chosen by the skilled formulator to produce compositions with the desired detergency and other properties.

The present invention further relates to a method for preparing a liquid laundry detergent formulation or a liquid dishwashing detergent formulation (i.e. each as the "final/finished composition"), comprising one step of adding the premix of the present invention into the formulation. Such method comprises mixing the inventive premix at any point in time during the preparation of the final/finished composition, i.e. at the very start as first addition, or at the end as the very last addition, and/or any time in between.

The present invention also relates to use of the premix of the present invention for preparing a liquid laundry detergent formulation or a liquid dishwashing detergent formulation.

The following Examples are provided to illustrate the present invention, which however are not intended to limit the present invention.

EXAMPLES

Materials and Measurements (APG-1): 50-53% (active matter by weight) of $C_{10}$-$C_{16}$ alkyl polyglucoside with DP of approximate 1.4, commercially available from BASF (APG-2): 62-65% (active matter by weight) of $C_8$-$C_{10}$ alkyl polyglucoside with DP of approximate 1.5, commercially available from BASF (APG-3): 60-65% (active matter by weight) of 2-ethylhexyl alkyl polyglucoside. The synthesis of 2-ethylhexyl alkyl polyglucoside is described in the patent application WO 2020/169632.

(APG-4): about 65% (active matter by weight) of $C_4$ alkyl polyglucoside, with DP of approximate 1.4, commercially available from BASF.

Sodium cumene sulfonate: about 40% (active matter by weight) MICOLIN SCS40 supplied from Miwon General Procedures and Settings for the Premix A premix process was implemented with the setup of an overhead mechanical stirrer (RW Digital, from IKA) and a water bath (HWS-26, from Yiheng Technology Co. Ltd,).

All raw materials for the premix were preheated at 40° ° C. in the oven (FD 115, from Binder) at least 1 hour for sufficient homogenization. Then, the preheated alkyl polyglycoside was pre-charged in a vessel with temperature control by the water bath. The agitation was started with a speed of 100 rpm to 500 rpm and the hydrotrope and/or solvent were dosed into the vessel stepwise in a certain time. After the dosage, the stirring was kept for 0.5 h to 3 h to get the final premix.

Stability Test for the Premix

The prepared premix was filled into glass bottles to be tested under different temperatures. Then, the bottles with premix samples were put into the stability test chambers (BPHS-060A, from Yiheng Technology Co. Ltd,) with constant temperature setting at 5° C., 10° C., 20° C. and 30° C., separately.

The premix samples were checked for the viscosity by a viscometer (DV2T LVT from Brookfield) with temperature circulator (TC-550MC, from Brookfield) and visually observed if crystallization happened. Subsequently, the viscosity and crystallization status were tracked and recorded till crystallization happened or up to 12 weeks.

Measurement of Pour Point

Pour point is a physical property of chemical, which hints feasibility to handle the chemical at different temperatures. It was measured by automatic cloud & pour point tester (HCP 852, from WALTER HERZOG GmbH) following ASTM D 5950.

Experimental Tests and Data

1. The Stability Tests of the Premix Comprising $C_{10}$-$C_{16}$ APG (APG-1) with Sodium Cumene Sulfonate Following the general procedures and settings for the premix, 145.45 g of APG-1 (50-53% aqueous solution) and 54.55 g of sodium cumene sulphonate (40% aqueous solution) were mixed. (alkyl polyglycoside used: APG-1 as commercially available from BASF).

The premix process was implemented with a 4-bladed propeller stirrer (R 1342, from IKA) under 300 rpm stirring speed and 45° C. water bath for 30 minutes according to the method of determination an apparent viscosity as specified ISO 2555.

Following the stability test for the premix, the viscosity and crystallization status were tracked and recorded; results are shown in Table 1.

TABLE 1

| | | Viscosity/mPa · s | | | | Crystallization [Yes (observed)/No (not observed)] | | | |
|---|---|---|---|---|---|---|---|---|---|
| | Weeks | 5° C. | 10° C. | 20° C. | 30° C. | 5° C. | 10° C. | 20° C. | 30° C. |
| Premix of APG-1 and SCS | 0 | 245 | 180 | 140 | 110 | No | No | No | No |
| | 1 | 260 | 190 | 140 | 110 | No | No | No | No |
| | 2 | 245 | 180 | 140 | 110 | No | No | No | No |
| | 4 | 230 | 210 | 150 | 130 | No | No | No | No |
| | 6 | 250 | 180 | 180 | 120 | No | No | No | No |
| | 8 | 250 | 230 | 170 | 140 | No | No | No | No |
| | 10 | 220 | 190 | 150 | 120 | No | No | No | No |
| | 12 | 180 | 160 | 110 | 100 | No | No | No | No |

SCS: sodium cumene sulfonate

The results show that the premix comprising the aqueous solution of APG-1 and sodium cumene sulfonate can be easily handled even when the temperature is below 5° C., and it is stable without crystallization between 5° C. to 30° ° C. for at least 12 weeks. Re-heating is/was not needed because the viscosity is/was always lower than 300 mPa·s at 5° C. to 30° C. and consequently it can be easily handled during shipment, storage and loading/unloading.

2. The Stability Tests of the Premixes Comprising $C_{10}$-$C_{16}$ APG (APG-1) with Different Solvents Following the general procedures and settings for the premix, APG-1 (50-53% aqueous solution) and different solvents were mixed (alkyl polyglycoside: APG-1 as commercially available from BASF).

The premix process was implemented with a 4-bladed propeller stirrer (R 1342, from IKA) under 300 rpm stirring speed and 45° C. water bath for 30 minutes according to the method of determination an apparent viscosity as specified ISO 2555.

Following the stability test for the premixes, the viscosity and crystallization status were recorded; the results are shown in Table 2.

TABLE 2

| Premix of $C_{10}$-$C_{16}$ alkyl polyglucoside with different solvents | | | | | | | | | |
|---|---|---|---|---|---|---|---|---|---|
| | APG | Hydrotrope | | Solvent | | Water | Viscosity/ mPa · s | Crystallization | Pour point/ |
| Premix | (a.m. %) | Type | a.m. % | Type | a.m. % | (a.m. %) | (20° C.) | (5° C.) | ° C. |
| APG-1 | 51.5 | 0 | 0 | 0 | 0 | 48.5 | >25,000 | Crystal observed | 5 |

TABLE 2-continued

Premix of $C_{10}$-$C_{16}$ alkyl polyglucoside with different solvents

| Premix | APG (a.m. %) | Hydrotrope Type | Hydrotrope a.m. % | Solvent Type | Solvent a.m. % | Water (a.m. %) | Viscosity/ mPa · s (20° C.) | Crystallization (5° C.) | Pour point/ ° C. |
|---|---|---|---|---|---|---|---|---|---|
| Premix-2 (APG-1 + water) | 16 | 0 | 0 | 10 | 0 | 84 | 3200 | Crystal observed | n.d. |
| Premix-3 (APG-1 + Ethanol/water) | 46.4 | 0 | 0 | Ethanol | 10 | 43.6 | 260 | Crystal observed | n.d. |
| Premix-4 (APG-1 + MPG/water) | 41.2 | 10 | 0 | MPG | 10 | 48.4 | 2700 | Crystal observed | n.d. |
| Premix-5 (APG-1 + SCS/water) | 35-39 | SCS | 10-13 | 0 | 0 | 51-52 | <300 | No crystal observed > 3 months | −3 |

MPG: monopropylene glycol
SCS: sodium cumene sulfonate
a.m. %: active matter by weight Premix of solvent like water and organic solvent popularly used in liquid laundry detergent and dish wash detergent formulations can degrease the viscosity of $C_{10}$-$C_{16}$ APG a lot but still can't inhibit crystallization at low temperature, specifically 5° C.

3. The Stability Tests of the Premixes Comprising $C_{10}$-$C_{16}$ Alkyl Polyglucoside with $C_4$-$C_{10}$ Alkyl Polyglucoside as Hydrotrope Following the general procedures and settings for the premix, alkyl polyglucoside with or without hydrotrope were mixed in aqueous solution (alkyl polyglycoside: APG-1 as commercially available from BASF).

The premix process was implemented with a 4-bladed propeller stirrer (R 1342, from IKA) under 300 rpm stirring speed and 45° C. water bath for 30 minutes according to the method of determination an apparent viscosity as specified ISO 2555.

Following the stability test for the premixes, the viscosity and crystallization status were recorded; results are shown in Table 3.

TABLE 3

Premix of $C_{10}$-$C_{16}$ Alkyl polyglucoside with $C_4$-$C_{10}$ Alkyl polyglucoside as hydrotrope

| Premix | $C_{10}$-$C_{16}$ APG (a.m. %) | Hydrotrope Type | Hydrotrope a.m. % | Water (a.m. %) | Viscosity/ mPa · s (5° C.) | Viscosity/ mPa · s (20° C.) | Crystallization (5° C.) | Pour point (° C.) |
|---|---|---|---|---|---|---|---|---|
| APG-1 | 50 | — | — | 50 | — | >25,000 | Crystal observed | 5 |
| Premix-6 (APG-1 + APG-2/water) | 30 | $C_8$-$C_{10}$ APG | 20 | 50 | 4400 | 2100 | No crystal observed > 3 months | −6 |
| Premix-7 (APG-1 + APG-2/water) | 15 | $C_8$-$C_{10}$ APG | 35 | 50 | 950 | 500 | No crystal observed > 3 months | −5 |
| Premix-8 (APG-1 + APG-3/water) | 40 | 2-EH APG | 10 | 50 | 5000 | 2200 | Crystal observed | n.d. |
| Premix-9 (APG-1 + APG-4/water) | 40 | $C_4$ APG | 10 | 50 | 2000 | 1000 | Crystal observed | n.d. |
| Premix-5 (APG-1 + SCS/water) | 35-39 | SCS | 10-13 | 51-52 | <300 | <200 | No crystal observed > 3 months | −3 |

2-EH APG: 2-ethylhexyl alkyl polyglucoside
SCS: sodium cumene sulfonate

Lower alkyl chain polyglycosides like $C_8$-$C_{10}$ Alkyl polyglucoside can also be used as hydrotrope by premixing with $C_{10}$-$C_{16}$ Alkyl polyglucoside for easy handling. However, high concentration of lower alkyl chain polyglucoside (>20%) is required to achieve desirable properties:

For example, 20% $C_8$-$C_{10}$ Alkyl polyglucoside was composed in premix-6, which inhibited crystallization, but had a still too high viscosity at 5° C.

In premix-7, $C_8$-$C_{10}$ alkyl polyglucoside was dominant with 35% dosage level and, consequently, both crystallization inhibition and low viscosity was achieved.

However, excess dilution with $C_8$-$C_{10}$ alkyl polyglycoside may lead to significant performance loss delivered by $C_{10}$-$C_{16}$ alkyl polyglycoside.

In addition, even short chain APG, specifically around 10% $C_4$-$C_8$ alkyl polyglucoside was also premixed with $C_{10}$-$C_{16}$ alkyl polyglucoside (Premix-8 and Premix-9 with less than 20% of dilution of $C_{10}$-$C_{16}$ APG). But the premixes were not stable more than 1 month at 5° C. to inhibit crystallization.

The results illustrate that the premix comprising $C_{10}$-$C_{16}$ APG with sodium cumene sulfonate has desirable stability performance than other premixes which comprises a hydrotrope other than SCS.

4. The Stability Tests of the Premixes Comprising $C_{10}$-$C_{16}$ APG (APG-1) and Sodium Cumene Sulfonate with Different Weight Ratios Following the general procedures and settings for the premix, alkyl polyglucoside with sodium cumene sulfonate were premixed in aqueous solution (alkyl polyglycoside: APG-1 as commercially available from BASF).

The premix process was implemented with a 4-bladed propeller stirrer (R 1342, from IKA) under 300 rpm stirring speed and 45° C. water bath for 30 minutes according to the method of determination an apparent viscosity as specified ISO 2555.

Following the stability test for the premixes, the crystallization status was recorded; results are shown in Table 4.

TABLE 4

The premix of $C_{10}$-$C_{16}$ APG with sodium cumene sulfonate with different weight ratios

| | APG-1 (a.m. %) | SCS (a.m. %) | Water | Crystallization (5° C.) |
|---|---|---|---|---|
| Premix A | 51.5 | 0 | 48.5 | Crystal observed within 1 day |
| Premix B | 41.2 | 8 | 50.8 | Crystal observed after 1 week |
| Premix C | 39.2 | 9.5 | 51.2 | No crystal >1 months |
| Premix D | 38.5 | 10.1 | 51.4 | No crystal >3 months |
| Premix E | 37.5 | 10.9 | 51.6 | No crystal >3 months |
| Premix F | 35.8 | 12.2 | 52.0 | No crystal >3 months |

SCS: sodium cumene sulfonate
a.m. %: active matter by weight

The results show that the premixes comprising $C_{10}$-$C_{16}$ APG and sodium cumene sulfonate with different weight ratios demonstrate excellent stability performance without crystals appearing over periods even longer than 3 months.

The invention claimed is:

1. A premix comprising an alkyl polyglycoside, at least one hydrotrope, and at least one solvent, wherein the alkyl polyglycoside is characterized by the formula:

$$C_nH_{2n+1}O(C_6H_{10}O_5)_xH,$$

wherein n is an integer from 10 to 18; and x is from 1 to 3;

wherein the at least one hydrotrope is sodium cumene sulfonate;

wherein the at least one solvent comprises water and optionally at least one water-miscible organic solvent; and wherein the weight ratio of the alkyl polyglycoside and the hydrotrope is from 75/25 to 80/20.

2. The premix according to claim 1, wherein the alkyl polyglycoside having an alkyl group of 10 to 16 carbon atoms is present in a range of 60% to about 100% by weight of the total weight of alkyl polyglycoside.

3. The premix according to claim 1, wherein the at least one water-miscible organic solvent is selected from the group consisting of methanol, ethanol, propanol, isopropanol, glycerol, propylene glycol, ethylene glycol, 1,2-propanediol, sorbitol, and any mixture thereof.

4. The premix according to claim 1, wherein the solvent is present in an amount of 40% to 90% by total weight of the premix.

5. The premix according to claim 1, having a pour point from −10° C. to 5° C.

6. A method for preparing a liquid detergent formulation, the method comprising mixing the premix according to claim 1 with at least one component selected from the group consisting of anionic surfactants, cationic surfactants, nonionic surfactants, zwitterionic surfactants, amphoteric surfactants, fatty acids, citric acid, builders, chelating agents, bleach and bleach activators, enzymes, suds suppressing agents, organic solvents including ethanol, 1,2-propane diol, and soil removing polymers.

7. The method according to claim 6, wherein the liquid detergent formulation is a liquid laundry detergent formulation or a liquid dishwashing formulation.

8. A method for preparing a liquid laundry detergent formulation or a liquid dishwashing detergent formulation, comprising a step of adding the premix according to claim 1 into the formulation, at the start or after the end or at any point during the preparation of the formulation.

9. A liquid laundry detergent formulation or a liquid dishwashing detergent formulation comprising the premix according to claim 1.

10. The premix according to claim 1, wherein n is an integer from 10 to 16.

11. The premix according to claim 1, wherein x is from 1.1 to 2.7.

12. The premix according to claim 1, wherein x is from 1.2 to 2.

13. The premix according to claim 1, wherein the solvent consists essentially of water.

14. The premix according to claim 1, wherein the alkyl polyglycoside having an alkyl group of 10 to 16 carbon atoms is present in a range of 70% to about 100% by weight of the total weight of alkyl polyglycoside.

15. The premix according to claim 1, wherein the solvent is present in an amount of 45% to 65% by total weight of the premix.

16. The premix according to claim 1, having a pour point from −10° C. to 0° C.

* * * * *